United States Patent
Willer et al.

(10) Patent No.: US 7,299,127 B2
(45) Date of Patent: Nov. 20, 2007

(54) SHARED OSCILLATOR FOR VEHICLE MIRROR DISPLAY

(75) Inventors: Michael Ian Willer, San Diego, CA (US); Takayasu Muto, Chigasaki (JP); Donald Robert Caldwell, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 623 days.

(21) Appl. No.: 10/648,587

(22) Filed: Aug. 26, 2003

(65) Prior Publication Data

US 2005/0119827 A1    Jun. 2, 2005

Related U.S. Application Data

(60) Provisional application No. 60/467,463, filed on May 2, 2003.

(51) Int. Cl.
  G01C 21/32 (2006.01)
(52) U.S. Cl. .......................... 701/213; 701/29; 701/33; 342/357.09; 340/989
(58) Field of Classification Search ................ 701/213, 701/29, 33; 342/357.09, 357.1; 340/989; 455/141
See application file for complete search history.

(56) References Cited

U.S. PATENT DOCUMENTS

| | | | |
|---|---|---|---|
| 6,002,363 A | 12/1999 | Krasner | 342/357.1 |
| 6,326,613 B1 | 12/2001 | Heslin et al. | 250/239 |
| 6,428,172 B1 | 8/2002 | Hutzel et al. | 359/838 |
| 6,445,287 B1 | 9/2002 | Schofield et al. | 340/442 |
| 6,477,464 B2 | 11/2002 | McCarthy et al. | 701/213 |
| 6,501,387 B2 | 12/2002 | Skiver et al. | 340/815.4 |
| 6,510,381 B2 | 1/2003 | Grounds et al. | 701/207 |
| 6,520,667 B1 | 2/2003 | Mousseau | 362/494 |
| 6,690,268 B2 * | 2/2004 | Schofield et al. | 340/438 |
| 6,693,517 B2 * | 2/2004 | McCarthy et al. | 340/425.5 |
| 6,741,931 B1 * | 5/2004 | Kohut et al. | 701/209 |
| 6,832,140 B2 | 12/2004 | Fan | 701/33 |
| 6,885,336 B2 * | 4/2005 | Forrester | 342/357.1 |
| 2001/0055165 A1 | 12/2001 | McCarthy et al. | 359/839 |
| 2002/0005999 A1 | 1/2002 | Hutzel et al. | 359/838 |
| 2002/0080063 A1 * | 6/2002 | Bloebaum et al. | 342/357.1 |
| 2002/0173889 A1 * | 11/2002 | Odinak et al. | 701/36 |
| 2002/0183904 A1 * | 12/2002 | Sakurai et al. | 701/33 |
| 2002/0193946 A1 * | 12/2002 | Turnbull | 701/219 |
| 2003/0040292 A1 * | 2/2003 | Peterzell et al. | 455/147 |
| 2003/0214432 A1 * | 11/2003 | Tawadrous et al. | 342/357.1 |
| 2004/0148102 A1 * | 7/2004 | McCarthy et al. | 701/213 |
| 2004/0204850 A1 * | 10/2004 | MacNeille et al. | 701/213 |
| 2004/0267419 A1 * | 12/2004 | Jeng | 701/36 |

* cited by examiner

Primary Examiner—Brian J. Broadhead
(74) Attorney, Agent, or Firm—John L. Rogitz

(57) ABSTRACT

A combined GPS/Bluetooth module for a vehicle may be mounted on, e.g., the rear view mirror housing to receive position information from GPS and other information (such as tire pressure and other vehicle diagnostic information) over a Bluetooth link. In turn, the module can transmit over Bluetooth both the GPS data and the diagnostic information to the vehicle onboard computer or to a PDA, wireless telephone, or other display-bearing device in the vehicle for display thereof.

17 Claims, 2 Drawing Sheets

Module architecture

SHARED OSCILLATOR FOR VEHICLE MIRROR DISPLAY

RELATED APPLICATIONS

This application claims priority from U.S. provisional application Ser. No. 60/467,463, filed May 2, 2003, incorporated herein by reference.

FIELD OF THE INVENTION

The present invention relates to vehicle display devices.

BACKGROUND OF THE INVENTION

A great deal of information can now be made available to an operator of a vehicle regarding the position, speed, and altitude of the vehicle, as well as a host of operating parameters, such as various vehicle diagnostic signals including wireless signal from tire pressure sensors and the like. It is often desirable that such information be made available for display.

As recognized by the present invention, positional information may be received using a global positioning satellite (GPS) system, whereas vehicle diagnostic information and other information may be received using a wireless link. The present invention further recognizes that one wireless link that may be effectively used, owing to its broad interoperability with a large number of computing devices, is the personal area network (PAN) radiofrequency (RF) link known Bluetooth. As still further recognized herein, particularly in the case of vehicles, where space and weight are at a premium for fuel conservation and where even a few cents of additional cost can take on critical importance, advanced systems preferably should be as compact as possible and use as few components as possible. To date, a combined GPS/Bluetooth information system for a vehicle has not been provided. With the above critical observations in mind, the invention disclosed herein is provided.

SUMMARY OF THE INVENTION

A wireless GPS system for, e.g., a vehicle includes a GPS antenna, a GPS receiver unit including a GPS synthesizer coupled to the GPS antenna, a Bluetooth antenna, and a Bluetooth transceiver unit including a transceiver synthesizer coupled to the Bluetooth antenna. A module holds the GPS receiver, Bluetooth transceiver, and the Bluetooth antenna, and the module includes a reference oscillator that provides signals to both the GPS receiver synthesizer and Bluetooth transceiver synthesizer.

In a preferred embodiment, a dual SAW filter package is in the module, with signals from both antennae being filtered through the SAW filter package. If desired, the GPS antenna may be mounted on the module and the module may be supported on a vehicle rear view mirror housing.

As set forth further below, the Bluetooth transceiver can receive data from the GPS receiver and then transmit the data to the vehicle engine control module and/or to a portable consumer computing device such -as a PDA, wireless telephone, or laptop computers, for display of the data. Also, the Bluetooth transceiver can receive vehicle diagnostic data from vehicle sensors.

In another aspect, a module includes a module housing holding a GPS receiver and a wireless transceiver communicating with the GPS receiver for transmitting information therefrom. One and only one reference oscillator is in the housing to provide mixing signals to the GPS receiver and the wireless transceiver.

In yet another aspect, a module includes a module housing that holds a GPS receiver and a wireless transceiver communicating with the GPS receiver for transmitting information therefrom. A dual SAW filter package is in the module, with signals from both a GPS antenna and a Bluetooth antenna being filtered through the SAW filter package.

In still another aspect, a method for data transmission includes sending GPS data to a Bluetooth transceiver. The data is transmitted using the Bluetooth transceiver to at least one of: a vehicle onboard computer, and a portable consumer computing device, at least for display of the data.

In another aspect, a system for data transmission includes wireless transceiver means, and means for sending GPS data to the transceiver means for transmission of the data to a vehicle onboard computer and/or to a portable consumer computing device in a vehicle, at least for display of the data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
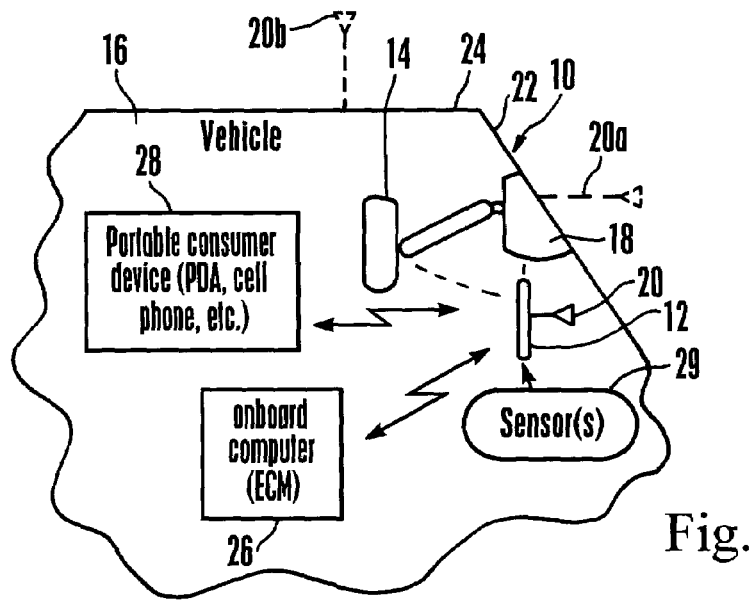
FIG. 1 is a schematic view of the present wireless GPS module in an exploded relationship with a rear view mirror housing, showing alternate GPS antenna positions in phantom.

Referring initially to FIG. 1, a system is shown, generally designated 10, that includes a wireless GPS module 12 that can be supported in a rear view mirror housing 14 of a vehicle 16. The module 12 may be supported elsewhere if desired, such as in a rear view mirror mount 18. In any case, a GPS antenna 20 may be supported on the module 12. Alternatively, the GPS antenna may be mounted elsewhere and electrically connected to the below-described GPS components on the module 12. For example, as shown at 20a, the GPS antenna may be mounted on the module itself, on the windshield 22 of the vehicle 16 in front of the mount 18, or it may be mounted on the roof 24, as shown at 20b.

Using a wireless link such as the below-described preferred Bluetooth link, the module 12 may communicate information to the vehicle's onboard computer 26, otherwise known as an engine control module. Alternatively or in addition, the module 12 may communicate with a portable consumer device 28, such as, e.g., a personal digital assistant (PDA), wireless telephone, laptop computer, or other device that preferably has a display for presenting information from the module 12. This information may be presented on the rear view mirror or other display surface of the vehicle 16 in accordance with mirror display principles known in the art. Instead of Bluetooth, the module 12 may use other types of personal area networks (PAN) or wireless local area networks (LAN) such as a wireless 802.11 link, the so-called "wi-fi" system, or even satellite or DSRC systems.

The information mentioned above may include vehicle diagnostic information as indicated by signals from one or more sensors 29. The sensors 29 may include one or more of tire pressure sensors, temperature sensors, compasses, remote keyless entry signal sensors, light sensors for headlamp control, airbag status indicators, rain sensors, etc. Also, while the word "sensor" is used it is to be understood that the wireless GPS module 12 may receive input from a microphone for hands-free voice recognition commands, trip function calculations, and the like, and may also communicate signals useful for garage door control and the like.

Figure 2:
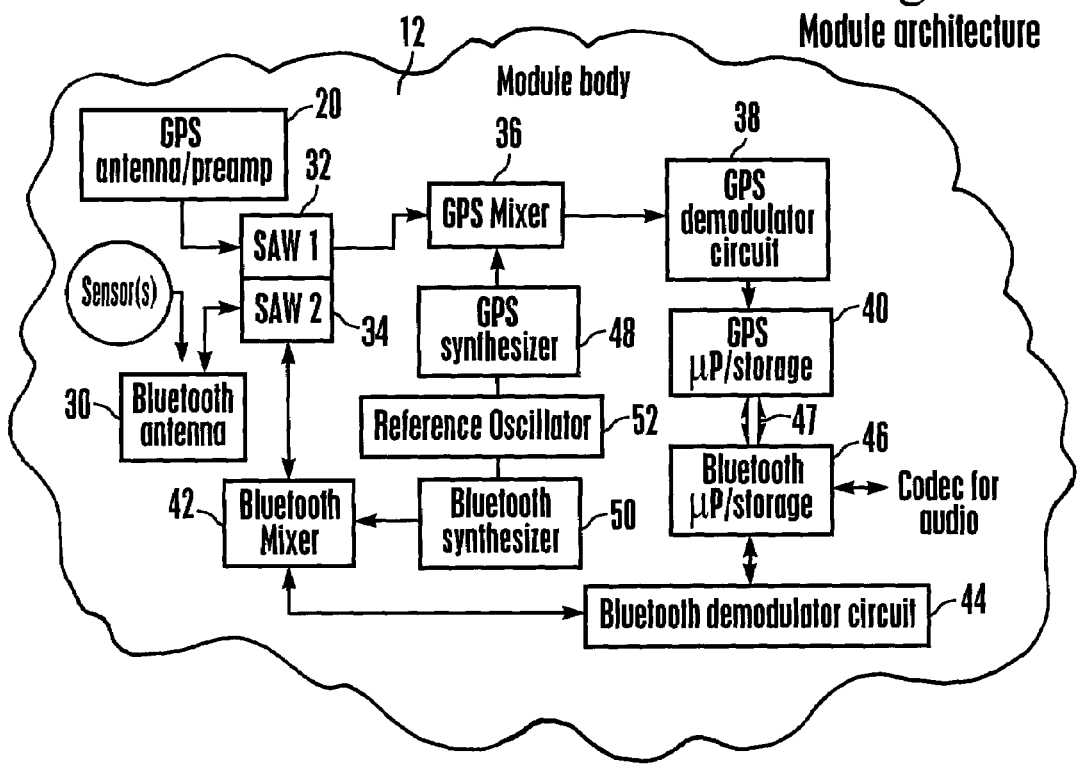
FIG. 2 is a block diagram of the wireless GPS module of the present invention.

FIG. 2 shows the details of the preferred wireless GPS module 12. As shown, on the body of the module 12 a Bluetooth antenna 30 can be mounted, as well as, if desired, the GPS antenna 20 (preferably with preamplifying circuitry). The signal from the GPS antenna 20 is filtered through a GPS surface acoustic wave (SAW) filter 32, whereas the signal from the Bluetooth antenna 30 is filtered through a Bluetooth surface acoustic wave (SAW) filter 34. Preferably, the SAW filters 32, 34 are packaged together on one substrate to establish a dual SAW filter package.

After filtering, the GPS signal is sent to a GPS mixer 36 for downconverting to an intermediate frequency, and then is demodulated by GPS demodulation circuitry 38 which may include an analog to digital converter (ADC), prior to being sent to digital GPS processing and storage circuitry 40 which may include a digital signal processor (DSP). Likewise, from its SAW filter 34 the Bluetooth signal is sent to a Bluetooth mixer 42 for downconverting to an intermediate frequency, and then is demodulated by Bluetooth modulation/demodulation circuitry 44, prior to being sent to digital Bluetooth processing and storage circuitry 46 which can, if desired, communicate with a CODEC for audio/voice recognition input. The processing and storage circuitry 46 may include a Bluetooth baseband component and a digital signal processor (DSP). The transmit path is in the reverse direction.

As shown in FIG. 2, information from the GPS processing and storage circuitry 40, such as position, speed, and altitude information, is sent to the Bluetooth processing and storage circuitry 46 over a link 47. The link 47 may be a universal serial bus (USB) or universal asynchronous receiver/transmitter (UART) link. Accordingly, the Bluetooth transceiver can wirelessly transmit the GPS information to the ECM 26 for display thereof on, e.g., the rear view mirror, or to the portable device 28 for display of the GPS information on the display of the portable device 28. Also, recall that the Bluetooth transceiver receives various vehicle diagnostic information from the sensors 29 (FIG. 1). This vehicle diagnostic information can also be sent wirelessly to the ECM 26 for display and/or the generation of appropriate control signals to various vehicle components. The diagnostic information may also be sent to the portable device 28 for display of the information thereon.

The GPS circuitry described above can be implemented by a Sony CXG2956 and/or CXG2951 GPS receiver, whereas the Bluetooth circuitry can be implemented by a Cambridge Silicon Radio "Bluecore 2" transceiver die that is packaged with the GPS receiver, although other implementations of Bluetooth transceivers may be used. Those skilled in the art will understand that GPS uses an rf signal having binary bi-phase modulation or shift keying (BPSK) at a frequency of 1575.42 MHz, while Bluetooth uses an rf signal having GFSK modulation with time division multiple access (TDMA) at 2.4 GHz-2.483 GHz.

As shown in FIG. 2, the GPS circuitry includes a GPS synthesizer 48 that sends a downconvert frequency to the mixer 36 in accordance with radio principles known in the art. Similarly, the Bluetooth circuitry includes a Bluetooth synthesizer 50 that sends a downconvert frequency to the Bluetooth mixer 42. In accordance with the present invention, both the GPS and Bluetooth transceivers described above receive appropriate mixing signals from a single reference oscillator 52, common to both receivers. That is, a single reference oscillator 52 feeds mixing signals to both the GPS synthesizer 48 and the Bluetooth synthesizer 52. No other components are shared by the receivers in the non-limiting embodiment shown in FIG. 2. In this way, off-the-shelf GPS and Bluetooth transceivers may be used and housed on a single module 12 without unduly modifying either receiver (typically implemented from the manufacturer on a chip), while conserving parts and space in that only one reference oscillator is used and in that both front-end SAW filters 32, 34 may be implemented in a single package.

Figure 3:
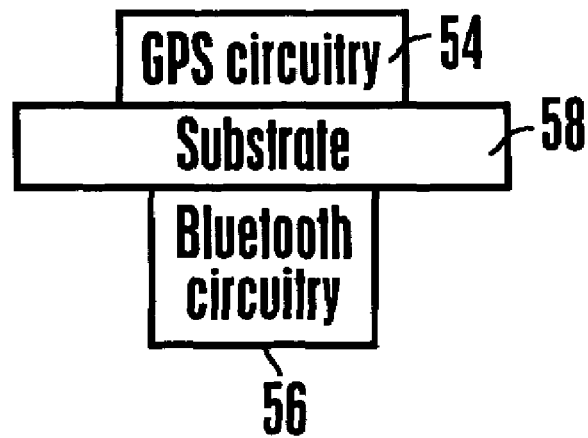
FIG. 3 is a schematic side elevational view of one physical module layout.
Figure 4:
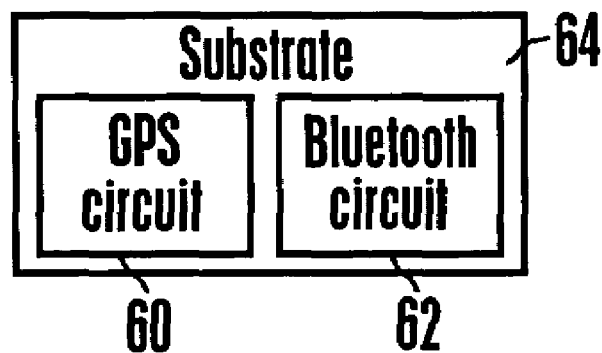
FIG. 4 is a schematic plan view of a second physical module layout.
Figure 5:
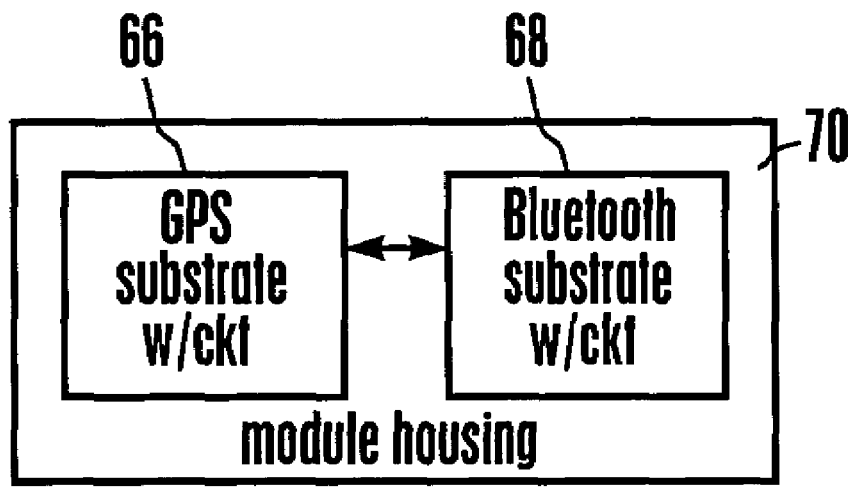
FIG. 5 is a schematic plan view of a third physical module layout.

FIGS. 3-5 show physical implementations of the above-described receivers. As shown in FIG. 3, a GPS receiver 54 and a Bluetooth transceiver 56 may be mounted on opposite sides of a substrate 58, which could hold the common reference oscillator and dual SAW filter package if desired. Alternatively, FIG. 4 shows that a GPS receiver 60 and a Bluetooth transceiver 62 may be mounted on the same side of a substrate 64, which could hold the common reference oscillator and dual SAW filter package if desired. As yet another alternative, in FIG. 5 a GPS receiver 66 is mounted on a first substrate and a Bluetooth transceiver 68 is mounted on a second substrate, with the substrates both being contained in a wireless GPS module housing 70. The GPS receiver 66 communicates with the Bluetooth transceiver 68 using, e.g., a wired USB/UART link.

While the particular COMMON ELECTRONICS ARCHITECTURE FOR VEHICLE MIRROR DISPLAY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A module, comprising:
    a module housing;
    a GPS receiver in the module housing and receiving position information;
    a wireless transceiver in the module housing and communicating with the GPS receiver for transmitting information received from the GPS receiver; and
    one and only one reference oscillator in the housing providing mixing signals to the GPS receiver and the wireless transceiver, the GPS receiver and wireless transceiver not sharing any components other than the reference oscillator.

2. The module of claim 1, wherein the wireless transceiver is a comprises short-range wireless transceiver.

3. The module of claim 1, further comprising a GPS antenna coupled to the GPS receiver;
    a second antenna coupled to the wireless transceiver; and
    a dual SAW filter package in the module, signals from both the GPS antenna and the second antenna being filtered through the SAW filter package.

4. The module of claim 1, further comprising:
    a GPS antenna coupled to the GPS receiver; and
    a second antenna coupled to the wireless transceiver;
    wherein the antennae are mounted on the module.

5. The module of claim 1, further comprising a vehicle rear view mirror housing supporting the module.

6. The module of claim 1, wherein the transceiver receives information from the GPS receiver and transmits the information to a component in a vehicle.

7. The module of claim 6, wherein data is transmitted from the transceiver to a portable computing device selected from the group consisting of: a PDA, a wireless telephone, and a laptop computer.

8. The module of claim 1, wherein the wireless transceiver receives vehicle data from at least one vehicle sensor and transmits the vehicle data.

9. A module, comprising:
    a module housing;
    a GPS receiver in the module housing and receiving position information;
    a wireless transceiver in the module housing and communicating with the GPS receiver for transmitting GPS information received from the GPS receiver;
    a dual SAW filter package in the module, signals from both a GPS antenna and a second antenna being filtered through the SAW filter package; and
    one and only one reference oscillator in the housing providing mixing signals to the GPS receiver and the wireless transceiver, the receiver and transceiver not sharing a mixer.

10. The module of claim 9, wherein the antennae are mounted on the module.

11. The module of claim 9, further comprising a vehicle rear view mirror housing supporting the module.

12. The module of claim 9, wherein the wireless transceiver receives data from the GPS receiver and transmits the data to a component in a vehicle.

13. The module of claim 12, wherein data is transmitted from the transmitter to a portable computing device selected from the group consisting of: a PDA, a wireless telephone, and a laptop computer.

14. The module of claim 9, wherein the wireless transceiver receives vehicle data from at least one vehicle sensor and transmits the vehicle data.

15. A system for data transmission, comprising:
    wireless transceiver means; and
    means for sending GPS data from a GPS receiver to the transceiver means for transmission of the GPS data to at least one of: a vehicle onboard computer, and a portable computing device in a vehicle, at least for display of the GPS data, wherein the wireless transceiver means and the GPS receiver share a common oscillator and only the common oscillator.

16. The system of claim 15, wherein the transceiver means comprises a wireless transceiver receiving vehicle diagnostic information and transmitting the diagnostic information to at least one of: the vehicle onboard computer, and the portable computing device.

17. The system of claim 15, wherein the portable computing device is selected from the group consisting of: a PDA, a wireless telephone, and a laptop computer.

* * * * *